United States Patent Office 3,233,599
Patented Feb. 8, 1966

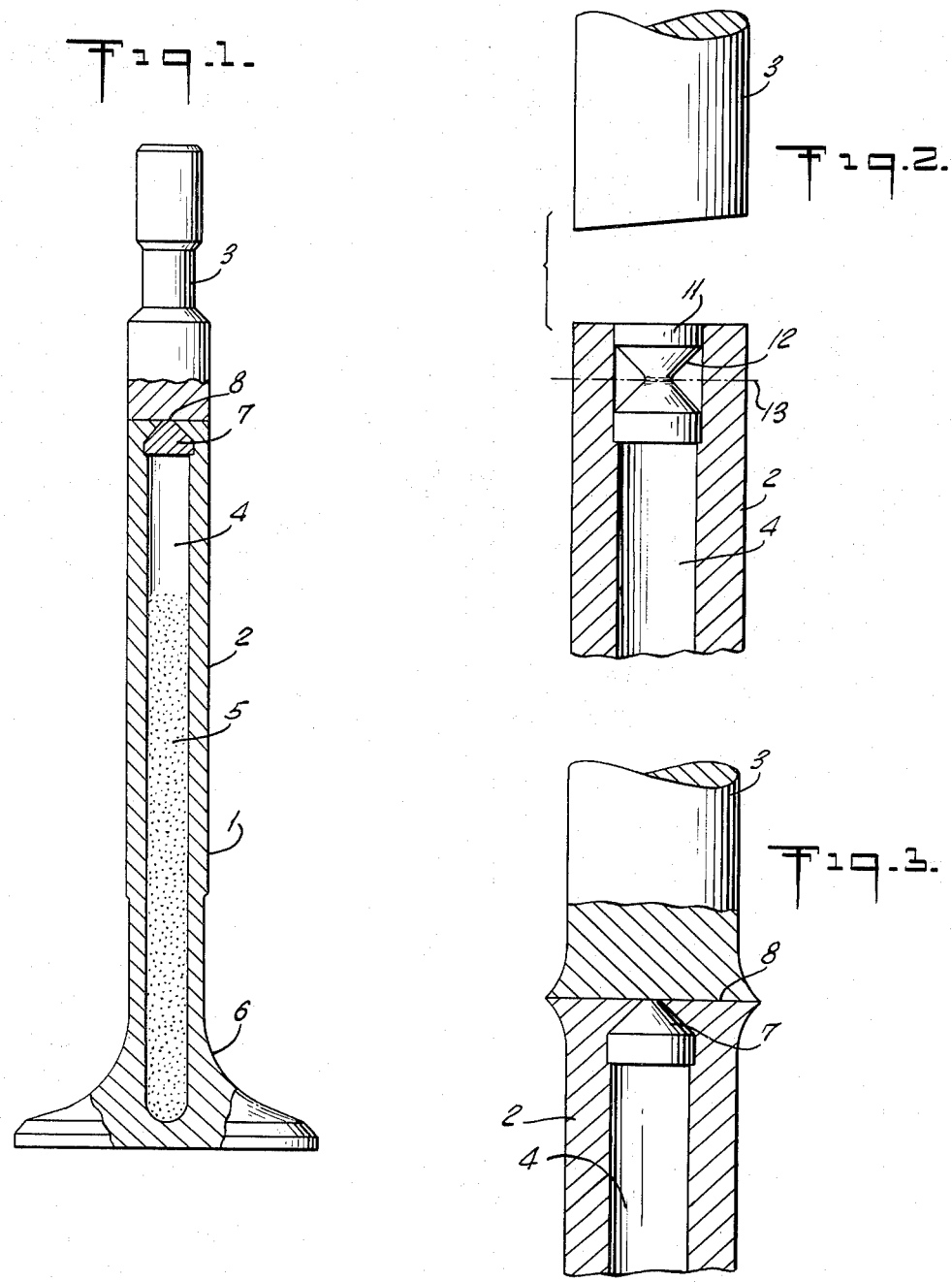

3,233,599
VALVE, VALVE-MANUFACTURING PROCESS AND ARTICLES USED IN SAID PROCESS
Franz Schober, Munich-Pasing, Germany, assignor to Bayerisches Leichtmetallwerk K.G., Munich, Germany
Filed Oct. 12, 1964, Ser. No. 403,209
8 Claims. (Cl. 123—41.16)

The present invention relates to valves.

In particular, the present invention relates to valves of the type which are used in internal combustion engines, especially exhaust valves which have hollow stems which are at least partly filled with a heat-conductive medium, such as sodium or the like.

It is known to manufacture valves of this type by forming a bore in a valve stem portion which is shorter than the final valve stem and which is integral with valve disk, the bore extending from an end of the valve stem portion up to but terminating short of the outer face of the valve disk. This bore is filled, for example, to ⅗ of its volume, approximately, with a heat-conductive medium such as metallic sodium, for example, and thereafter the open end of this bored valve stem portion is closed with a suitable metallic plug, whereupon a solid valve stem portion is placed in end to end relation with respect to the bored valve stem portion and welded thereto so as to form an extension thereof. This plug, which is conventionally used to close the bored valve stem portion, is of a cylindrical configuration, and the solid valve stem portion is generally made of a different material from the bored valve stem portion since in the finished valve it will form an anchor for a valve spring and will be a part of the valve which is mechanically stressed to a considerable degree, while the bored valve stem portion, and the valve disk with which it is integral, are subjected to excessive heat stresses rather than to purely mechanical stresses.

The conventional cylindrical plug which closes the bore of the bored valve stem portion does not in any way participate in the butt welding of the two valve stem portions to each other. In order to provide the best possible butt welding of these valve stem portions to each other, it is known to form a bore in that end of the solid valve stem extension which is to be welded to the plugged end of the originally bored valve stem portion, so that in this way there will be at least some approach to a uniform heating of both valve stem portions during the welding thereof. The result is that the welding joint has a ring-shaped configuration and the relatively large intermediate region of the cylindrical plug is completely uninfluenced by and does not in any way participate in the joint between the valve stem portions.

This known process, for manufacturing a valve of the above type, thus does not provide a very strong connection between the welded valve stem portions, and the plug itself is not secured in the most reliable manner.

There are other known processes according to which the bore extends from the front face of the valve disk through the latter and into the valve stem, but such processes present even greater disadvantages since the closed end of the bore is then subjected to very great heat stresses.

It is accordingly a primary object of the present invention to provide a process for manufacturing a valve of the above type in a manner which will provide a very strong, secure connection between the valve stem portions.

Furthermore, it is an object of the invention to provide a process which will not only securely join the valve stem portions to each other but which will in addition provide a very secure anchoring of the plug in its position closing the bore which is at least partly filled with the heat-conductive medium.

A further object of the present invention is to provide a valve manufactured by the process of the invention and articles which can be used in a process of the above type.

Also, it is an object of the invention to provide a process which lends itself to very effective butt-welding of the valve stem portions to each other.

Primarily, the process of the invention is used for manufacturing a valve which has a hollow valve stem which is at least partly filled with a heat-conductive medium, and this process of the invention includes the step of closing the open end of a bored valve stem portion, after the bored portion is at least partly filled with a heat-conductive medium, with a plug which has a pair of opposed ends and which is formed intermediate its ends with an annular groove of V-shaped cross section so that the plug has between its ends an intermediate portion of reduced cross section, this cross section of the plug being at a minimum at the throat of the annular groove of V-shaped cross section. A solid valve stem portions is placed in end-to-end relation with respect to the thus-closed bored valve stem portion, at the closed end thereof, and these valve stem portions are then butt welded to each other in a manner which situates the plane of the weld joint at the portion of the plug which is of smallest cross section, so that during the welding the part of the plug which extends from the throat thereof toward the solid valve stem portion is burned away and the material of the valve stem portions engages the exterior surface of the plug extending from the throat thereof toward the end of the plug which is directed away from the solid valve stem portion.

The invention is illustrated by way of example in the accompanying drawings which form part of the application and in which:

FIG. 1 is a partly sectional elevation of a valve manufactured according to the process of the present invention, with the articles of the present invention;

FIG. 2 fragmentarily illustrates a pair of valve stem portions before they are welded to each other, FIG. 2 also illustrating the plug of the present invention in a position closing the bored valve stem portion and shown with the configuration it has prior to the welding of the valve stem portions to each other; and FIG. 3 is a fragmentary sectional elevation of the welded joint between the valve stem portions prior to machining of the exterior thereof but at the end of the welding thereof to each other.

Referring now to FIG. 1, there is illustrated therein a valve 1, which may be an exhaust valve of an internal combustion engine, and this valve 1 has a bored valve stem portion 2 and a solid valve stem portion 3, these valve stem portions 2 and 3 being fixedly joined to each other so as to form the entire valve stem of the valve 1. The bore 4 of the valve stem portion 2 is filled, approximately to ⅘ of its volume, although ⅗ also would be sufficient, with a medium 5 having a good coefficient of thermal conductivity, such as, for example, metallic sodium, this metallic sodium being in power or particulated form. The bore 4 extends through the valve shaft portion 2 up to but terminates short of, the enlarged valve-disk end 6 of the valve 1, this end 6 being adapted to engage the valve seat and to provide for the opening and closing of the cylinder of the combustion engine, in a well known manner. Thus, the bore 4 will initially have an open end distant from the valve disk 6, prior to the joining of the valve stem portion 3 to the valve stem portion 2, and this open end of the bore 4 is closed by a metallic plug 7 which is seated at its bottom end, as viewed in FIG. 1, on a shoulder which is formed in the bore 4, this shoulder being directed upwardly, as viewed in FIG. 1, so as to engage the bottom end face of the plug 7. The valve stem portions 2 and 3 are butt welded to each other to form the welded joint 8 where, in fact, the valve stem materials of the portions 2 and 3 have fused into each other to such an extent that for all practical purposes an integral valve stem 2, 3 is provided in this way. It is to be noted that with the structure of the invention, the weld joint 8 extends practically throughout the entire cross section of the valve stem.

FIG. 2 illustrates, on an enlarged scale as compared to FIG. 1, the end of the valve stem portion 2 which is distant from the valve disk 6, in the condition which the valve stem portion 2 has before it is welded to the solid valve stem portion 3 which is shown in FIG. 2 above and spaced from the bored stem portion 2. FIG. 2 also illustrates how the open end of the bore 4 is closed by the metallic plug 11 which has a pair of opposed ends between which this plug 11 is formed with an annular groove 12 of V-shaped cross section, thus providing the plug 11 with an intermediate portion of tapering reduced cross section having a throat situated in the plane 13, indicated in FIG. 2, where plug 11 is of a minimum cross section.

After the plug 11 has been situated, in the manner shown in FIG. 2, in the open end of the bore 4 so as to close the latter, the pair of valve stem portions 2 and 3, while in axial alignment with each other, are brought together in end-to-end relation and butt welded to each other. As is well known a suitable electrical current is applied to the ends of the portions 2 and 3 which are butt welded to each other, and the electrical current heats the material of the valve stem portions 2 and 3 at the adjacent ends thereof until this material becomes fairly plastic, whereupon the air of valve stem portions 2 and 3 are forcefully pushed one against the other in an axial direction so as to upset the valve stem material at the ends of the portions 2 and 3 thereof and thus cause this material to fuse and weld together so as to form the butt-welded joint of the present invention.

The butt welding of the present invention is carried out to such an extent that when the material at the ends of the portions 2 and 3 is heated and burned away, as well as upset, the welded joint becomes situated in the plane 13 where the throat of the plug 11 is situated, so that the welded joint 8 will be situated in a plane extending across the part of the plug 11 which has a minimum cross section. During the welding process the part of the plug 11 which extends from the throat thereof toward the solid valve stem portion 3 becomes molten and disappears since it fuses to the welded joint, or simply becomes burned away, so that after the welding is completed there remains only the plug 7 shown in FIGS. 1 and 3, this plug 7 having the construction of only the lower half of the plug 11 which is shown in FIG. 2.

It is to be noted that the material of the valve stem portions 2 and 3, during the welding thereof, completely fills the groove 12 while the upper portion of the plug 11 is molten and fuses into the adjoining material of the stem portions, so that the stem material engages the tapering exterior side surface of the plug 7 in the manner shown in FIG. 3.

The reference characters shown in FIG. 3 correspond to those of FIG. 1, and the structure is shown in FIG. 3 at the end of the welding step. It is to be noted that the material at the welded ends of the stem portions 2 and 3 becomes upset not only inwardly, so as to become situated against the exterior surface of the plug 7, but also outwardly. After the welding step is completed, the valve stem is machined so as to eliminate the outwardly projecting upset portions of the weld, thus providing the stem with the exterior configuration illustrated in FIG. 1.

The extent to which the diameter of the plug 11 is reduced by the groove 12 is such that at the throat of the groove the plug 11 will have a minimum diameter which is approximately ⅓ of its maximum diameter.

Moreover, it is to be noted that one of the valve stem portions 2 and 3 is provided with an inclined end face to facilitate the butt welding of these valve stem portions to each other, as is well known in the art. FIG. 2 shows on an enlarged scale how the end face of the solid valve stem portion 3, which is directed toward the bored valve stem portion 2, is inclined, this inclination in practice being only approximately 5°.

Furthermore, it is apparent that with the process of the invention the area of the welded joint will be considerably greater than has heretofore been the case inasmuch as the area of the welded joint will extend almost entirely throughout the cross section of the valve stem, because it is located at the part of the plug 11 which has the minimum cross section. This enlarging of the area of the welded joint not only increases the strength of the connection between the valve stem portion 2 and 3, but in addition it provides a very effective mechanical anchoring of the plug 7 in the valve stem by the upsetting of the valve stem material against the exterior surface of the plug 7. In this way it is possible to achieve with the invention a sharp increase in the strength of the joint of the valve stem, as compared to conventional valve stems.

It will thus be seen that the plug 11 of the present invention participates to a very great degree in the welding of the valve stem portions to each other inasmuch as this plug becomes fused into the welded joint, and thus the plug itself becomes securely welded with the valve stem portions. The initial annular groove of the plug is filled with the material of the valve stem portions, due to the upsetting of these valve stem portions, so as to provide the above-mentioned very secure mechanical anchoring of the plug 7. The inclination of the end face of the shaft portion 3, referred to above, provides in a known way a superior electrical contact between the valve stem portions during the butt welding thereof.

The bored valve stem portion 2 preferably forms approximately ⅔ the length of the entire valve.

What is claimed is:

1. In a process for manufacturing a valve which has a hollow stem which is at least partly filled with a heat-conductive medium, the steps of closing the open end of a bored valve stem portion, which has been at least partly filled with a heat-conductive medium, with a plug which has a pair of opposed ends and which is formed between its opposed ends with an annular groove providing the plug with an intermediate portion of reduced cross section, and butt welding to the thus-closed end of said valve stem portion a second valve stem portion which forms an extension of the bored valve stem portion, the butt welding of said valve stem portions to each other being carried out to an extent which fills the annular groove of said plug with valve stem material.

2. In a process as recited in claim 1, said second valve stem portion being solid and said butt welding being carried out to an extent which situates the plane of the weld joint approximately midway between the ends of said plug.

3. In a process as recited in claim 1, said annular groove of said plug having a substantially V-shaped cross section so that said plug has a minimum cross section at the throat of said annular groove and the step of butt welding being carried out to such an extent that the weld joint is situated at said throat with the portion of the plug which extends from said throat toward said second valve stem portion prior to the butt welding step disappearing during the welding so that only the portion of the plug which is directed away from said second valve stem portion remains in the final valve.

4. In a process as recited in claim 1, said closed end of said bored valve stem and the end of said second valve stem which is applied thereto during the butt welding respectively having end faces which make a relatively slight angle one with respect to the other just prior to the butt welding of said valve stem portions to each other.

5. In a process for manufacturing a valve having a hollow valve stem which is at least partially filled with a heat conductive medium, the steps of closing an open end of a bored valve stem portion which is partly filled with said medium, with a plug which has a pair of opposed ends and which is formed between its opposed ends with an annular groove of V-shaped cross section providing said plug with an intermediate reduced portion having a minimum cross section at the throat of said groove, and welding to said thus-closed end of said valve stem portion a solid valve stem portion forming an extension of said bored valve stem portion, the part of said plug which extends from said throat toward said solid valve stem portion prior to the welding of the latter to said bored valve stem portion to being burned away during the welding and the plane of the weld joint being situated, at the end of the welding step, at the throat of said plug with the material of the welded valve stem portions engaging that part of the plug which extends from the throat thereof away from said solid valve stem portion.

6. For use in the manufacture of a valve which has a hollow valve stem which is partly filled with a heat conductive medium, a plug having a pair of opposed ends and formed between its ends with an annular groove of V-shaped cross section providing the plug with an intermediate portion of reduced diameter.

7. For use in the manufacture of a valve which has a hollow valve stem which is at least partly filled with a heat-conductive medium, a valve member having a valve stem portion which is axially bored and which has one open end, the axially bored valve stem portion being adapted to be filled at least partly with a heat-conductive medium, a plug adapted to close the open end of the bored valve stem portion, said plug having a pair of opposed ends and being formed between said opposed ends with an annular groove of V-shaped cross section providing said plug with an intermediate portion of reduced diameter, and a solid valve stem portion adapted to form an extension of said bored valve stem portion, after the open end of the latter has been closed by said plug, by welding of said solid valve stem portion to said end of said bored valve stem portion which has been closed by said plug.

8. A valve having a stem including a bored valve stem portion filled at least partly with a heat-conductive medium and said bored valve stem portion being closed at one end by a plug of substantially frustoconical configuration, said valve stem having a second portion which extends from said bored portion and is welded thereto at a joint situated in a plane extending transversely of the valve stem approximately at that part of the plug which has a minimum cross section.

References Cited by the Examiner
UNITED STATES PATENTS

| | | | |
|---|---|---|---|
| 1,823,454 | 9/1931 | Jardine | 123—41.16 X |
| 2,369,063 | 2/1945 | McDill | 123—41.16 |

KARL J. ALBRECHT, *Primary Examiner.*